UNITED STATES PATENT OFFICE.

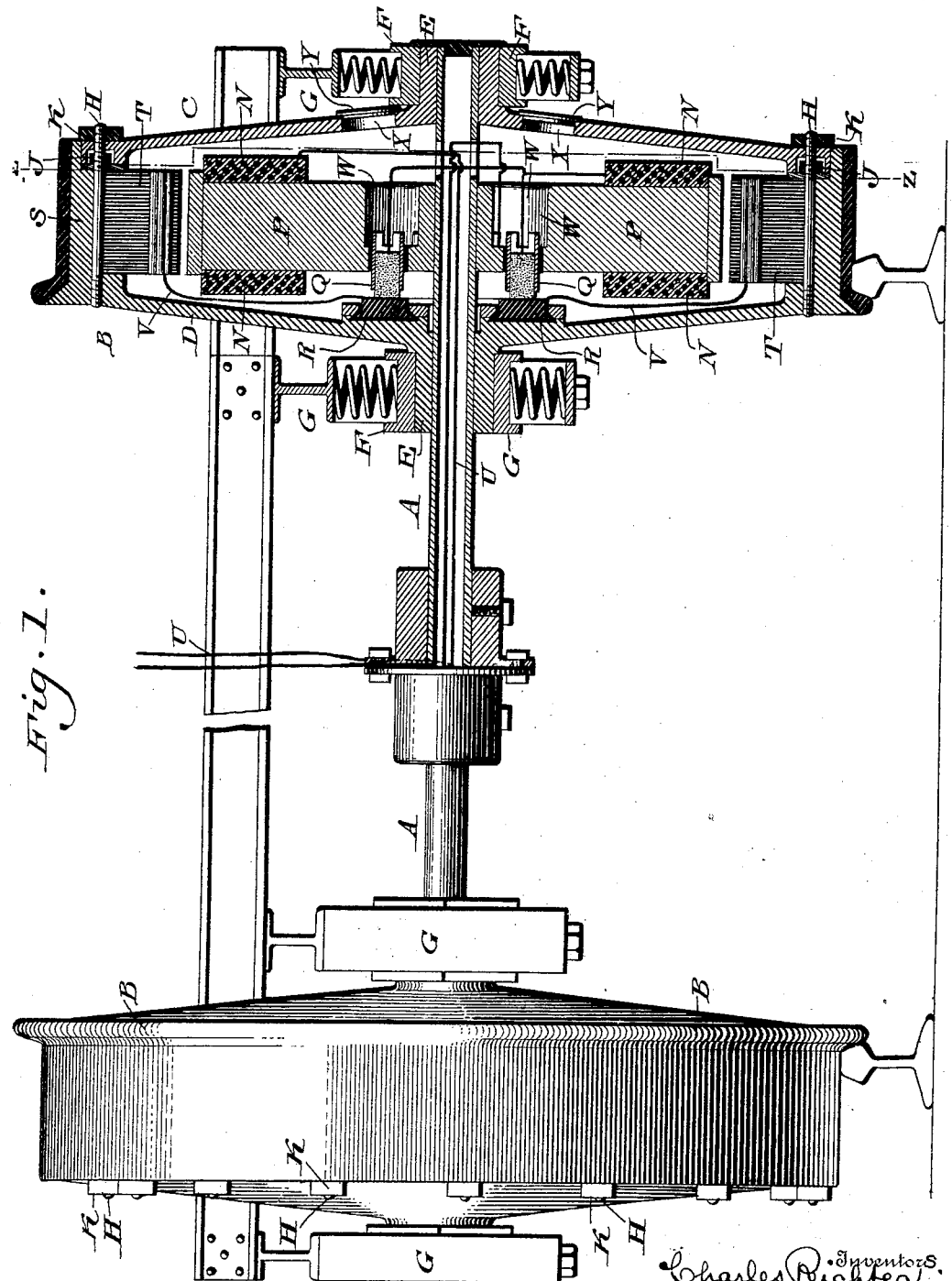

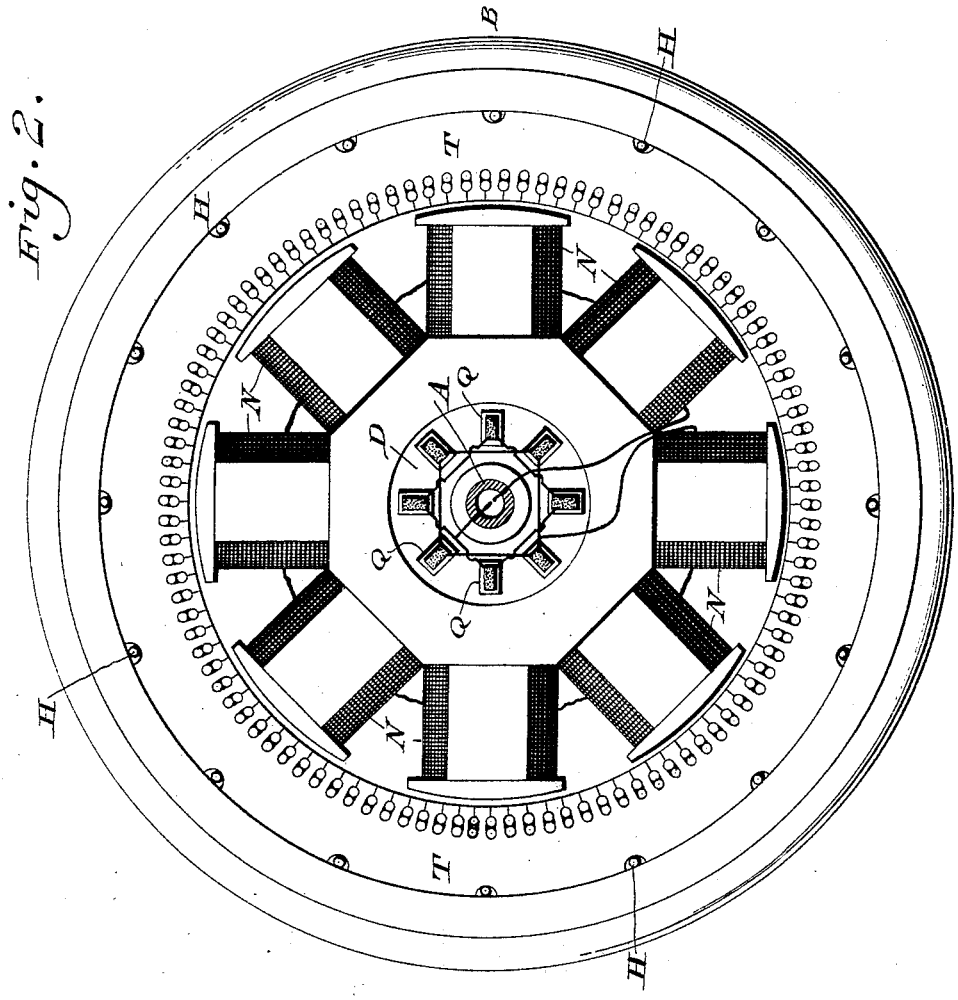

CHARLES RICHTER AND RICHARD T. ESCHLER, OF CAMDEN, NEW JERSEY, ASSIGNORS TO THE SECURITY TRUST AND SAFE DEPOSIT COMPANY, TRUSTEE, OF NEW JERSEY.

ELECTRIC TRACTION-MOTOR.

SPECIFICATION forming part of Letters Patent No. 643,276, dated February 13, 1900.

Application filed May 19, 1899. Serial No. 717,451. (No model.)

*To all whom it may concern:*

Be it known that we, CHARLES RICHTER and RICHARD T. ESCHLER, citizens of the United States, residing in the city and county of Camden, State of New Jersey, have invented a new and useful Improvement in Electric Traction-Motors, which improvement is fully set forth in the following specification and accompanying drawings.

Our invention relates to an improvement in an electric motor for traction purposes; and it consists of a car-wheel containing electric mechanism adapted to operate the wheel by direct currents, so that the same will rotate with great rapidity, while its construction is strong and durable.

It also consists of convenient means for access to the interior of the wheel and withdrawing the field-magnet core and connected parts.

It also consists of means for conveniently reaching the brushes of the commutator.

It also consists of details of construction, all as will be hereinafter fully set forth, and particularly pointed out in the claims.

Figure 1 represents a partial front elevation and partial diametrical section of a motor embodying our invention. Fig. 2 represents a side elevation of a wheel employed with a side plate removed.

Similar letters of reference indicate corresponding parts in the figures.

Referring to the drawings, A designates a car-axle, and B designates car-wheels thereon, the former being stationarily mounted on the truck of a car and the latter rotating on said axle. The wheels are chambered and formed of side sections or webs C and D, provided with trunnions or hubs E, with brasses or boxes F for said hubs, and pedestals or hangers G, carrying said boxes and attached to the truck, as best employed for running the car. The sections C and D are connected by the bolts H and nuts J K, thus firmly uniting the same, the section D in the present case having the flanges L of the wheels thereon, said sections having also on their inner sides the commutators R. Within the chambers of each wheel are electromagnets N, whose cores P are firmly secured to the axle A and carry on the sides thereof the brushes Q, which contact with the commutators R on the inner side of the web D. Connected with the rim S of the wheel, on the interior thereof, is the armature T, which freely encircles the field-magnet P, but revolves with said wheel.

The axle A is hollow and receives the electric conductors U, the latter passing through the portion of the axle within the wheel and joining the magnets and brushes. Connecting the armature and commutators are the electric conductors V, it being seen that the wheel will be rotated by a direct current and so be powerful and rapid in its operation.

The axle A is formed in sections coupled in any suitable manner, so that when the web C is removed the field-magnets and connected parts may be drawn out with its section of the axle for purposes requiring the same.

In order to provide access to the interior of the wheel, especially to the brushes Q, the latter occupy the recesses W in the field-magnet core, and in the web C, opposite to or nearly opposite to said recesses, are openings or manholes X, which are closed by caps Y, which when removed uncover said recesses and consequently the brushes.

In the inner side of the web C, at the rim thereof, are recesses Z, the same receiving and inclosing the nuts J of the bolts, the ends of the latter having the nuts K thereon for tightening purposes, thus controlling the bolts and thereby firmly connecting the webs of the wheels. It will also be seen that the wheel is entirely closed, so that dirt, &c., are prevented from entering the same.

Having thus described our invention, what we claim as new, and desire to secure by Letters Patent, is—

1. The combination of a hollow car-wheel having a web provided with a manhole, an axle carrying a field-magnet with an opening in the core thereof, and a brush seated in said opening, said manhole being opposite to said opening.

2. The combination of an axle, a field-magnet and a brush thereon, and a wheel mounted on said axle revolving in suitable bearings, said wheel being composed of sections, one of which carries an armature and a commutator, and the other section is provided with a manhole.

3. In an electric motor, the combination of an axle, a hollow car-wheel rotatably mounted thereupon and made in sections, said sections consisting of webs having recesses therein, bolts passed through said webs, nuts inclosed in said recesses and exterior jam-nuts on the ends of said bolts and electrical means for rotating said wheel.

4. In a device of the character named, an axle, a wheel composed of sections which are provided with hubs rotating in suitable bearings, a fastening for said sections, a commutator on the interior of one of the sections, a field-magnet which is secured to said axle, a brush carried by said magnet, an armature connected with the inner periphery of one of the sections, and an electric conductor leading to the interior of said wheel.

CHARLES RICHTER.
RICHARD T. ESCHLER.

Witnesses:
JOHN A. WIEDERSHEIM,
WM. C. WIEDERSHEIM.